UNITED STATES PATENT OFFICE.

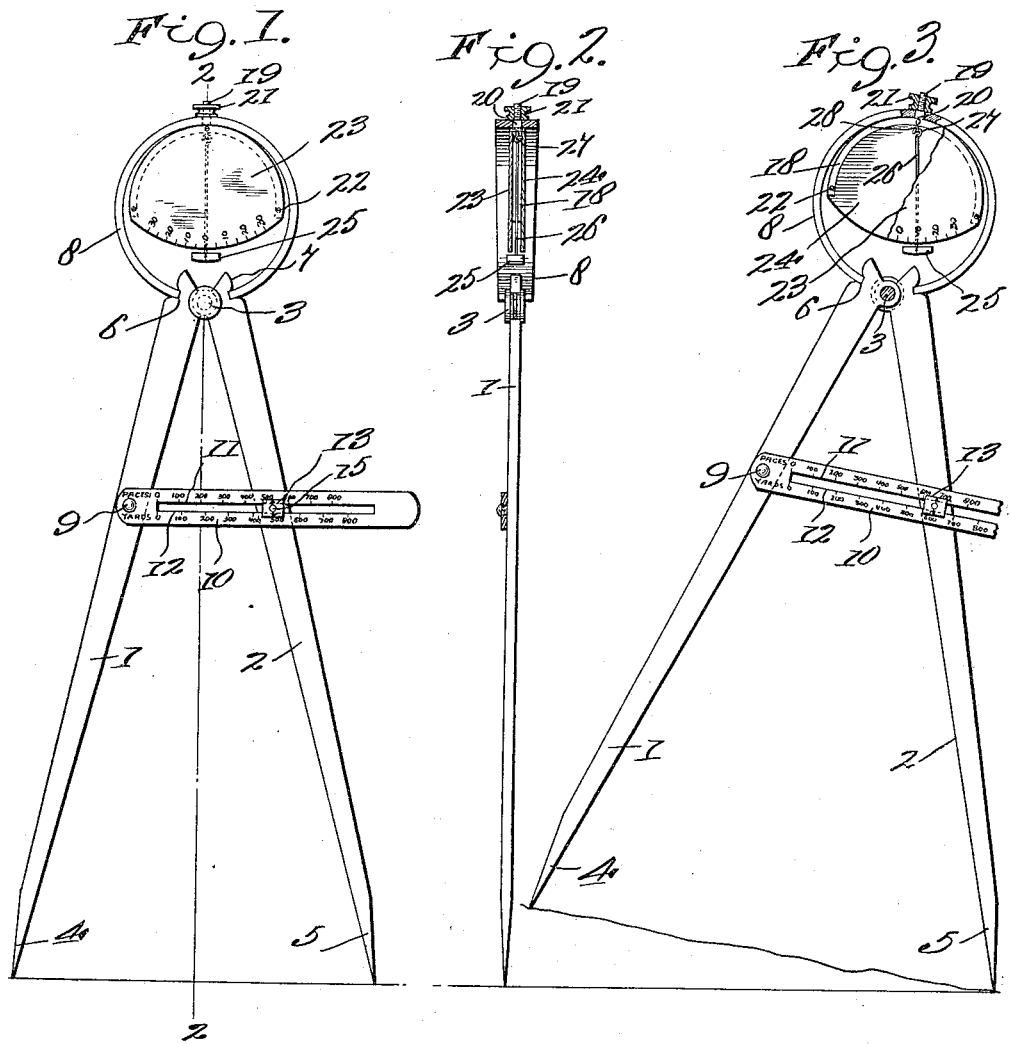

ALFRED W. BJORNSTAD, OF THE UNITED STATES ARMY.

INSTRUMENT FOR USE IN TOPOGRAPHY.

1,219,430.   Specification of Letters Patent.   Patented Mar. 20, 1917.

Application filed April 13, 1916. Serial No. 90,938.

*To all whom it may concern:*

Be it known that I, ALFRED W. BJORN-STAD, a citizen of the United States, stationed at Fort Leavenworth, in the county of Leavenworth and State of Kansas, have invented certain new and useful Improvements in Instruments for Use in Topography; and I do hereby declare the following to be a full, clear, and exact description of the invention, such as will enable others skilled in the art to which it appertains to make and use the same.

The present invention relates to improvements in instruments for use in topography, and consists in an improved instrument for advantageous use in connection with a map such as constructed in accordance with my co-pending application Serial No. 83,857, filed March 13, 1916; although the use of the instrument is not limited to this application but may be employed in other connections, as will be readily suggested to those familiar with the art.

It is the primary object of the present invention to provide an instrument for use in connection with relief or other maps whereby the student may be instructed in the art of map making, topographic sketching, siting cannon, and problems which involve either distance or slope, or both; and broadly stated, the improved instrument embodies a pair of dividers provided with a scale for indicating distances being measured between the points of the dividers in terms of different units, the scales being produced in terms of the actual distances which are represented on the map in connection with which the instrument is used; and, moreover, the instrument further contains a clinometer fitted within the spring associated with said dividers, and which clinometer yields slope measurements when the instrument is used on a relief map.

In the accompanying drawings forming a part of this application, and in which similar reference symbols indicate corresponding parts in the several views:

Figure 1 is a front elevational view of an improved instrument constructed in accordance with the present invention.

Fig. 2 is a vertical sectional view taken on the line 2—2 in Fig. 1, which line represents the axis of the instrument.

Fig. 3 is a front elevational view, partly broken away, of the improved instrument shown as applied for slope measurement.

Fig. 4 is a sectional view through one of the divider legs and slotted scale.

Fig. 5 is a perspective view of a threaded plug; and

Fig. 6 is a similar view of a slide used in conjunction with the invention.

Referring more particularly to the drawings, 1 and 2 designate the legs of the divider which are connected together by a pivot 3 at their upper ends and are tapered into points 4 and 5 at their lower free ends.

The upper ends of the legs 1 and 2 are formed with notches 6 and 7 for receiving the divided ends of a circular split spring 8, the same operating to open the legs 1 and 2.

To one leg, 1, is connected by a pivot 9, one end of a slotted scale 10, which bears series of graduations 11 and 12 along each edge of the slot and which are graduated in terms of different units of measurements, such, for instance, as paces and yards, as indicated at the left on the scale 10 in Figs. 1 and 3.

A flanged slide 13, shown to advantage in Fig. 6, is fitted to move in the slot in the scale 10, and is traversed by a threaded perforation 14, which is adapted to register with a smooth bore perforation 15 in the leg 2, through which passes the threaded shank 16 of a thumb plug 17. By tightening the plug 17 it will be seen that the slide 13 may be clamped into tight frictional engagement with the scale 10, and thereby secure the legs 1 and 2 in position after adjustment against the influence of the spring 8, which normally tends to spread said legs.

It will thus be appreciated that when the divider is applied to the map, in the manner indicated in Figs. 1 and 3, so that the points 4 and 5 embrace a linear measurement on the map, the actual distance on the ground between these two points represented on the map is ascertainable by a direct reading on the scale 10, the scale being suitably graduated with respect to the scale of the map in question and with reference to two selected measurements of unit, such as the paces and yards above referred to; and such direct readings will be taken at the indexes marked on the slide 13.

In accordance with the present invention the split circular spring 8 is of an increased size to contain a clinometer, which is preferably constructed in substantially the manner shown in the drawings and as now described. An arcuate bar 18 is supported on a threaded stem 19 provided with a squared shoulder 20 occupying a similarly shaped perforation in the center of the spring 8. A nut 21 is threaded on the stem 19 and removably secures the clinometer in place, the same being prevented from turning in the spring 8 due to the squared shoulder 20 engaging the walls of the perforation therein.

To the arcuate bar 18 are secured, as by rivets or other means 22, a pair of substantially semi-circular plates 23 and 24 having lower arcuate and graduated edges. A bob 25 is carried on the lower end of a pendulum rod 26, formed at its upper end into an eye 27 engaging a hook 28 supported from the arcuate bar 18. As will appear more particularly from Fig. 2, the pendulum rod 26 is arranged to swing between the spaced plates 23 and 24, and the bob 25 carried on the lower end thereof will move over the graduated edges of said plates and will indicate the angle of slope as seen in Fig. 3.

As indicated in Fig. 1, when the points 4 and 5 of the legs 1 and 2 lie on a flat surface in a horizontal line, the pendulum bob 25 will rest at zero in the axis 2—2 of the instrument wherein the same is pivoted to swing. When, however, as will appear from Fig. 3, the legs 1 and 2 are applied to measure distances over inclinations, the pendulum bob 25 will move over the graduated edges of the plates 23 and 24 in obedience to gravity, and will indicate on said graduated edges the angle between the pendulum and the axis 2—2 of the instrument, which angle will be equal to the angle formed between a line drawn through the points 4 and 5 of the legs 1 and 2 and a horizontal line in the same vertical plane. It will thus be seen that the clinometer when properly graduated, will accurately measure the slope or vertical angle of a line drawn through the points 4 and 5 of the legs 1 and 2.

It will be appreciated that the instrument is particularly valuable for use in connection with map making, topographic sketching, siting cannon, and other instruction which involves distance or slope, or both, on a relief map particularly, the combined clinometer and scale herein described serving as a useful instrument which may take the place of transit and stadia or the like instruments for all measurements except those of horizontal angles. With the aid of this instrument a student indoors may make a relief map, employing exactly the same operations and data as required in surveying by plane table method with transit and stadia or chain, or in topographic sketching as practised in the military service on actual terrain, but with the advantage of supervision by instructors. Of course the instrument may be useful in other connections and for other purposes, and it is not restricted to its employment as herein set out.

When the instrument is graduated for use with a relief map the vertical scale of which is different from the horizontal scale, the graduations on the clinometer are correspondingly changed so as to indicate by direct reading the slope or vertical angle as it would be if the vertical and horizontal scales were alike, thus giving, by direct reading, the true slope or angle of the actual ground which the relief map represents.

It is obvious that those skilled in the art may vary the details of construction and arrangements of parts without departing from the spirit of my invention, and therefore I do not wish to be limited to such features except as may be required by the claims.

I claim:

1. An instrument for use in topography comprising pivoted legs, a spring associated with said legs, and a clinometer carried by said spring, substantially as described.

2. An instrument for use in topography comprising pivoted legs, a circular spring connected to said legs, a clinometer mounted within said spring and including a pair of graduated plates, and a pendulum swinging between said plates, substantially as described.

3. In an instrument for use in topography, the combination of pivoted legs, a circular spring associated with said legs, and a clinometer fitted within said spring and including an arcuate bar, graduated plates secured to said bar, and a pendulum fitted to swing between said plates, substantially as described.

4. In an instrument for use in topography, the combination of pivoted legs, a split circular spring connected to said legs and having a perforation therein, an arcuate bar fitted within said spring, a stem on said arcuate bar passing through the perforation in said spring, means for holding said stem and bar in position, a pair of graduated plates secured to said arcuate bar, a pendulum rod fitted to swing between said plates, and a bob on said pendulum rod for moving beneath the lower edges of said graduated plates, substantially as described.

5. An instrument for use in topography including pivoted legs, a slotted scale pivoted to one of said legs and bearing separate series of graduations representing different units of linear measurements for giving actual distances from a map made to a scale corresponding therewith, and means for engaging through the slot in said scale and connected to the other leg for securing the same in adjusted position, substantially as described.

6. An instrument for use in topography including pivoted legs, a slotted scale pivoted to one of said legs and having graduations thereon corresponding to a given map, a slide having indexes for use in connection with the graduations and fitted in the slot in said scale, and a threaded plug engaging through the other of said legs and said slide for clamping the latter into tight frictional engagement with said scale to hold the legs in adjusted position, substantially as described.

In testimony whereof, I affix my signature.

ALFRED W. BJORNSTAD.

Copies of this patent may be obtained for five cents each, by addressing the "Commissioner of Patents, Washington, D. C."